Patented Dec. 19, 1950

2,535,014

UNITED STATES PATENT OFFICE 2,535,014

DIPHENOL COMPOUND COMPOSITION FOR COCCIDIOSIS CONTROL

Julius E. Johnson, Jr., Midland, and Dorsey E. Mussell, Clare, Mich., assignors to The Dow Chemical Company, Midland, Mich., a corporation of Delaware No Drawing. Application June 19, 1948, Serial No. 34,134

5 Claims. (Cl. 167—53.1)

This invention relates to coccidiosis control and is particularly directed to compositions and methods for the suppression of coccidial infection in poultry and the like.

Coccidiosis is a very contagious protozoan disease prevalent among ducks, turkeys, geese, pigeons, and chickens. The disease causes high mortality among fowl of all ages, especially in young maturing birds, and constitutes one of the major problems confronting the commercial grower.

The coccidia invade various organs, but particularly the digestive tract of their host. They erode the epithelial tissue of the small intestine and cecum of the fowl, bringing about hemorrhage, weakness, and serious digestive disturbances. Birds, if they do not succumb to the infection, are rendered economically unfit by chronic forms of the disease.

A number of remedies have been proposed for the suppression of coccidiosis. Their administration has conveniently been accomplished through the feed or water employed in the diet. Many of the materials have been nostrums of little efficacy, while others are too expensive or toxic to permit their prophylactic administration. One of the difficulties encountered in such administration has been the poisoning of the hemopoietic system and the subsequent reduction in the number of red and white blood cells throughout the body. Another disadvantage has been the adverse effect of certain of the materials upon immature fowl in retarding growth. The need for inexpensive prophylactic methods for the suppression of coccidial infection is well recognized.

An object of this invention is the provision of an inexpensive improved method and composition for the suppression of coccidial infection in poultry. An additional object is the provision of a method and composition which may be employed prophylactically without adversely affecting the metabolic activity or rate of growth of the fowl. Other objects will become apparent from the following specification.

According to this invention, we have discovered that coccidial infection in poultry may be suppressed by feeding a diphenol having the following formula:

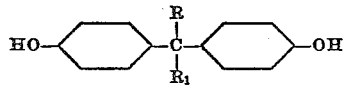

wherein $R_1$ represents a member of the group consisting of the phenyl and alkyl radicals, R represents a member of the group consisting of the alkyl radicals and hydrogen, and the sum of the carbon atoms in R and $R_1$ is 6. The group

is illustrated by the following:

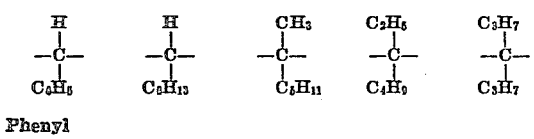

Phenyl

These compounds are inexpensive and may be fed in admixture with the feed or otherwise introduced into the intestinal tract in dosages sufficient to suppress the development of the infection without adversely affecting the fowl or its rate of growth. The compounds do not impart any unpalatable odor, taste or flavor to the flesh of fowl prepared for eating.

The compounds may be administered continuously with the feed or through the more hazardous early weeks of life, during which the bird is most susceptible to infection. It is to be understood that the described treatment is essentially of a preventive nature, and is most effective in suppressing the disease when administered prior to or within a short time following exposure to infection. In practice, this is best accomplished by administering the diphenols daily.

In practice, good results have been obtained when each bird ingests daily from 250 to 700 milligrams of the diphenol per kilogram of body weight. The preferred dosage varies somewhat with the particular diphenol employed. In feed, the diphenol content should be so adjusted that the amount of agent ingested falls within the indicated range. Where the medicated feed constitutes the principal ration, from 0.2 to 0.4 per cent by weight of the agent may be employed with satisfactory results.

A convenient mode of operation comprises dispersing a finely ground diphenol in the feed employed as a part of sole ration for the flock. In another method the diphenol is dissolved in an edible oil, such as cottonseed, coconut, olive, or cod liver oil, and this solution dispersed in the feed. An additional method comprises dissolving the diphenol in a small amount of an organic solvent, such as acetone, dispersing this mixture in the feed and drying the feed to remove the solvent. Any commercial starting, growing, or laying mash may be employed as a carrier for the diphenol. Such feed should contain a quantity of ground grains, meat or protein substitute, powdered milk, minerals, and vitamins sufficient to furnish a diet adequate for the metabolic requirements of the fowl concerned. Alternatively, the diphenols may be administered in the form of capsules or tablets, either alone, or dispersed in a suitable non-toxic carrier. The method of suppressing coccidial infection and the medicated feed compositions, whereby this desirable result is accomplished, constitute the invention.

The diphenols of this invention may be prepared by reacting 1 mol of an aldehyde or ketone with 2 mols of phenol. In practice the use of a molecular excess of the phenol is preferred. Examples of aldehydes and ketones which may be employed are benzaldehyde, heptaldehyde, methyl amyl ketone, ethyl butyl ketone, or propyl propyl ketone. The reaction is carried out in the presence of an acid-acting condensing agent, such as hydrochloric acid, sulphuric acid, or hydrogen chloride. Good results are obtained when operating at temperatures of 40° C. or lower and employing 5 mols of phenol per mol of aldehyde or ketone. In practice from about 0.3 to 0.5 mol of hydrogen chloride per mol of the ketone or aldehyde present in the mixture has been found to favor the production of the compounds in high yields.

The phenol and aldehyde or ketone are mixed together and hydrogen chloride added portionwise with stirring. The condensation begins immediately upon the introduction of the hydrogen chloride with the production of the desired diphenol compound and water of reaction. The reaction is exothermic and stirring and cooling are generally required during the addition of the condensing agent to prevent overheating. Best yields are obtained by allowing the reaction mixture to rest for several days at room temperature before attempting separation of the desired product. The separation may be accomplished in conventional manner by repeated washing of the crude reaction product with water; fractionally distilling under reduced pressure to recover solvent, water and excess phenol; and steaming the residue to remove the last traces of unreacted phenol.

Alternatively, the condensation of phenols and ketones may be advantageously carried out in the presence of a sulfur-containing catalyst as described in U. S. Patent 2,359,242.

*Example 1* p,p - Heptylidene diphenol (melting point 109.5°–110.5° C.) having the following formula:

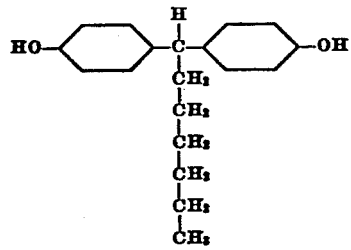

was dissolved in a small quantity of acetone. This mixture was dispersed in a commercial poultry starting mash and the mash evaporated to dryness. The diphenol was employed in an amount sufficient to produce a mash containing 0.2 per cent by weight of the agent. This composition and the unmodified starting mash were fed as sole ration to two groups of chickens. Each group consisted of four chickens which were two weeks of age. 24 hours after the initiation of the diet, 40,000 *Eimeria tenna* oöcysts were introduced directly into the crop of each bird. Seven days following the inoculation, the birds were sacrificed and autopsied. A cecal examination of each bird was carried out to determine the extent of cecal necrosis and a sample of cecal content was removed and examined microscopically for the presence or absence of oöcysts. The numerical ratings 0, 1, 2, 4 and 8 were assigned both to the degree of necrosis and to the abundance of oöcysts in the cecum. The ratio of the summation of these ratings to the total number of observatons carried out in the particular group of fowl gives the degree of infection present in the birds. A comparison between the degrees of infection of treated and untreated control groups serves as a basis for estimating the efficacy of the treatment, according to the following formula:

$$\text{Index of efficacy} = \left(\frac{x-y}{x}\right) \cdot 100$$

wherein $x$ represents the degree of infection of control birds and $y$ the degree of infection of treated birds. The numerical ratings, degrees of infection, and index of efficacy, are recorded in the following table:

|  | Chickens Fed Modified Mash | Chickens Fed Unmodified Mash |
| --- | --- | --- |
| Chicken No. | 1-2-3-4 | 1-2-3-4 |
| Numerical rating of cecal necrosis | 0-0-2-0 | 8-4-4-2 |
| Numerical rating of abundance of oöcysts | 0-0-1-0 | 8-4-4-4 |
| Degree of infection in the group | 0.37 | 4.75 |
| Index of efficacy | 92 | |

*Example 2*

Starting mashes containing various diphenols were prepared and tested with unmodified mash in a manner similar to that of Example 1. The concentrations and types of diphenols employed in the mash compositions together with the indices of efficacy are recorded in the following table:

| Active Ingredient | Formula | Melting Point | Per Cent by Weight of Diphenol in Mash | Index of Efficacy |
|---|---|---|---|---|
| p,p'-heptylidene-diphenol | HO-⌬-CH(–CH₂–CH₂–CH₂–CH₂–CH₂–CH₃)-⌬-OH | °C. 109.5–110.5 | 0.3<br>0.1 | 100<br>86 |
| p,p'-(1-methylhexylidene)-diphenol | HO-⌬-C(CH₃)(–CH₂–CH₂–CH₂–CH₂–CH₃)-⌬-OH | 97–99 | 0.3<br>0.2 | 98<br>91 |
| p,p'-(1-ethylamylidene)-diphenol | HO-⌬-C(CH₂CH₃)(–CH₂–CH₂–CH₂–CH₃)-⌬-OH | 115–117 | 0.3<br>0.2 | 97<br>87 |
| p,p'-(1-propylbutylidene)-diphenol | HO-⌬-C(CH₂CH₂CH₃)(CH₂CH₂CH₃)-⌬-OH | 151.5–153 | 0.2 | 86 |
| p,p'-benzylidene-diphenol | HO-⌬-CH(C₆H₅)-⌬-OH | 160–164 | 0.3 | 90 |

Example 3 p,p'-(1-ethylamylidene)-diphenol was ground through a screen having 0.295 millimeter square openings. This finely ground diphenol was mechanically dispersed in a commercial poultry starting mash to produce a composition containing 0.2 per cent by weight of the agent. This composition and unmodified mash were fed as a complete ration for 44 days to two groups of chickens. Each group consisted of 40 white rock cockerels which were 4 days old. At intervals the chickens were weighed and the average weight per chicken for each group determined. The average weights at the end of various feeding intervals for the treated and control groups are recorded in the following table:

| Age of Chicken in Days | Average Weight in Pounds | |
|---|---|---|
| | Mash Containing 0.2 Per Cent Diphenol | Unmodified Mash |
| 4 | 0.097 | 0.095 |
| 9 | 0.122 | 0.122 |
| 16 | 0.197 | 0.184 |
| 23 | 0.35 | 0.27 |
| 30 | 0.55 | 0.44 |
| 37 | 0.77 | 0.66 |
| 44 | 1.00 | 0.95 |

We claim:

1. A composition for the suppression of coccidial infection in poultry which comprises a poultry feed and dispersed therein as an active ingredient a diphenol having the following formula:

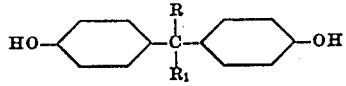

wherein $R_1$ represents a member of the group consisting of the phenyl and alkyl radicals, R represents a member of the group consisting of the alkyl radicals and hydrogen, and the sum of the carbon atoms in R and $R_1$ is 6.

2. A composition for the suppression of coccidial infection in poultry which comprises a poultry feed and dispersed therein as an active ingredient a diphenol having the following formula:

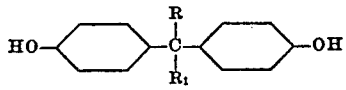

wherein $R_1$ represents a member of the group consisting of the phenyl and alkyl radicals, R represents a member of the group consisting of the alkyl radicals and hydrogen, and the sum of the carbon atoms in R and $R_1$ is 6, the diphenol being present in the amount of from 0.2 to 0.4 per cent by weight of the composition.

3. A composition for the suppression of coccidial infection in poultry which comprises a poultry feed and dispersed therein as an active ingredient p,p'-(1-propylbutylidene)-diphenol in the amount of from 0.2 to 0.4 per cent by weight of the composition.

4. A composition for the suppression of coccidial infection in poultry which comprises a poultry feed and dispersed therein as an active ingredient p,p'-(1-methyl hexylidene)-diphenol in the amount of from 0.2 to 0.4 per cent by weight of the composition.

5. A composition for the suppression of coccidial infection in poultry which comprises a poultry feed and dispersed therein as an active ingredient p,p'-(1-ethyl amylidene)-diphenol in the amount of from 0.2 to 0.4 per cent by weight of the composition.

JULIUS E. JOHNSON, Jr.
DORSEY R. MUSSELL.

REFERENCES CITED

The following references are of record in the file of this patent:

UNITED STATES PATENTS

| Number | Name | Date |
|---|---|---|
| 2,057,690 | Moss | Oct. 20, 1936 |
| 2,058,394 | Arvin | Oct. 27, 1936 |
| 2,061,779 | Semon | Nov. 24, 1936 |
| 2,158,446 | Werft | May 16, 1939 |

OTHER REFERENCES

Farmer's Bulletin, 1652 (1932), page 38.